Aug. 16, 1960  J. F. NENZELL  2,949,325
HIGH PRESSURE SEALING DEVICE
Filed Feb. 27, 1956
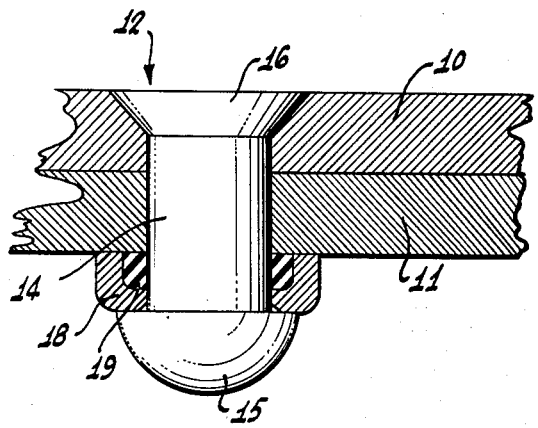
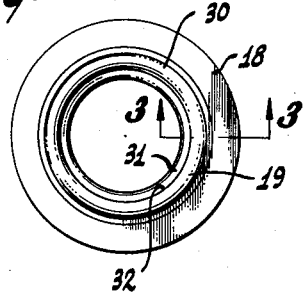
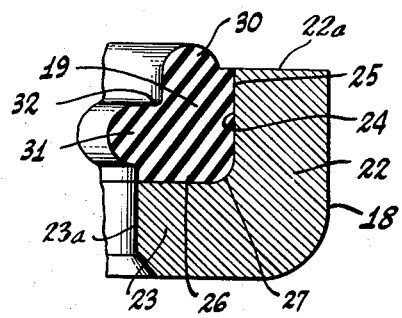
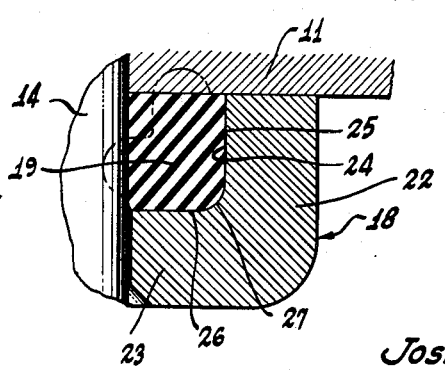
INVENTOR.
JOSEPH F. NENZELL
BY Fulwider Mattingly & Huntley
ATTORNEYS

United States Patent Office 2,949,325
Patented Aug. 16, 1960

2,949,325

HIGH PRESSURE SEALING DEVICE

Joseph F. Nenzell, Culver City, Calif., assignor, by mesne assignments, to Parker Hannifin Corporation, Cleveland, Ohio, a corporation of Ohio Filed Feb. 27, 1956, Ser. No. 567,877

8 Claims. (Cl. 288—23)

This invention relates generally to a sealing device for sealing around the shank of bolts, rivets and similar fasteners and more particularly to a device of this kind which is of compact and high pressure sealing design.

In Patent No. 2,396,005 there is disclosed a form of sealing washer which has found widespread acceptance for sealing around the shank of a fastener that passes through a tank wall or other fluid barrier. This sealing washer employs a deformable ring which is mounted within a rigid retaining washer. Upon tightening of the fastener, the ring is deformed in shape to make sealing contact with the head and shank of the fastener, the inner peripheral surface of the washer and the adjacent wall surface of the tank, and is so deformed that it changes from a substantially circular sectional shape to a rectangular sectional shape to fit within the confined space defined by the adjacent rigid structure. This principle of deforming a rubber-like member, and at the same time confining it against plastic extrusion has been found to produce a very good seal since the deformed member seeks to resume its original shape and thus exerts high pressure sealing contact against the opposing surfaces.

In order to prevent plastic extrusion of the ring, it will be seen that it is necessary to define a rectangular sectioned confining space which has a volume equal to that of the ring. This is done in the aforementioned patent by providing void corner spaces within the retaining washer into which the material of the projecting portions of the ring is deformed. The displaced material of the ring exerts a reactive force or pressure tending to return it to its original position and makes tight sealing contact with the rigid surface opposite to it.

Considering this sealing problem in more detail, it will be seen that the memory or reactive pressure of the deformed material should not be uniform over the entire outer periphery of the deformed ring. The tendency towards plastic extrusion of the ring will occur in the corner portions of the confining chamber where there are lines of separation of the different rigid parts. Accordingly, it is highly desirable that the memory pressure of the deformed material be reduced in such corner area. It will also be understood that the most effective seal is obtained by increasing the unit pressure along a line or band of sealing contact in each sealing plane rather than to have a lower unit pressure spread over the entire area of the sealing plane.

In addition to those considerations just mentioned it is desirable that the void spaces be accurately controlled to have the proper volumetric relationship to the projecting portions of the ring, and thus not be dependent upon the size and shape of the rigid metal parts but only upon the conformation of the deformable member which can be accurately molded.

With the foregoing in mind it is a major object of this invention to provide a sealing device of the character described having a rigid retaining body and a cooperating deformable member of such conformation as to exert a high memory pressure against appropriate bands along the sealing planes to achieve a high pressure seal.

An equally important object of the invention is to provide a deformable member of such configuration that the deforming or memory pressure is not exerted in the corners of the confining chamber where extrusion of the deformable member may occur.

Another object of the invention is to provide a sealing device of the character described wherein the void space for accommodating the deformed packing material is accurately volumetrically controlled by being defined entirely within the packing member.

Still another object of the invention is to provide a sealing device which is of compact and high strength design and is particularly adapted for use with small high strength fasteners subjected to high shear and tension forces.

A further object of the invention is to provide a sealing device which is formed with the working portions of the deformable member accurately shaped and free from variations or surface irregularities due to the molding flash lines.

These and other objects and advantages of the invention will become apparent from the following detailed description of the preferred form thereof and from an inspection of the accompanying drawings in which:

Figure 1 is a partial cross section of a typical tank wall structure showing an embodiment of the invention installed on a rivet-like fastener;

Figure 2 is a plan view of the preferred device;

Figure 3 is an enlarged cross sectional detail taken along the line 3—3 of Figure 2; and Figure 4 is a view similar to Figure 3 showing the device in installed position with the packing member deformed from its original shape.

Referring now to the drawings and particularly to Figure 1 thereof, a pair of upper and lower overlapping plates 10 and 11 are shown as forming part of the wall structure of a tank or other fluid-tight housing. Extended through plates 10 and 11 is a fastener in the form of a rivet 12 having a cylindrical shank 14 and an enlarged head 15 at one end. The opposite end of rivet 12 is flared at 16 in the usual manner to hold it tightly and securely in place. Mounted between the rivet head 15 and the surface of the lower wall plate 11 is a preferred form of the subject invention which functions to prevent any fluid leakage around rivet shank 14. The subject device comprises an outer rigid retaining body or washer 18 and an inner deformable packing member or ring 19 making sealing engagement with both the peripheral surface of shank 14 and the adjacent surface of plate 11. By reason of the sealing engagement of member 19 with these two surfaces it will be seen that it functions as a positive seal or barrier to prevent any fluid flow across the wall structure through the opening in which shank 14 is fitted.

The retaining body or washer 18 is of annular shape having an outer portion 22 spaced outwardly from shank 14 and joined integrally at the lower end with an overhanging or inwardly projecting portion 23 which is adapted to seat firmly under the rivet head 15, and fits closely around the rivet shank. Washer 18 is formed of rigid high strength metal, or the like, and acts to transmit tension and stress loading directly from the rivet head 15 to the wall plate 11. The inwardly projecting washer portion 23 has a large surface area of contact with rivet head 15 and thus permits the use of the sealing device without any reduction in the normal shear and stress loading strength of the rivet.

Considering the upper inner portion of washer 18 it will be seen that annular portion 22 and portion 23 together define an annular chamber or groove 24 of substantially rectangular cross section having an outer side wall 25 and a lower wall 26. The outer bottom corner of chamber 24 may be formed with a small radiused fillet 27 joining the walls 25 and 26. Chamber 24 opens upwardly against the surface of plate 11 and inwardly against the peripheral surface of shank 14, and the planes of these two surfaces become the planes of sealing engagement along which it is desired to form bands or lines of high pressure sealing contact.

Fitted within washer chamber 24 and preferably molded in place is the deformable packing member 19. This member 19 is formed of a resilient deformable material such as rubber which, as will be understood, is substantially incompressible although deformable in shape under pressure. The volume of member 19 is substantially equal to or slightly less than the volume of chamber 24, but as can best be seen in Figure 3, the configuration of member 19 in its normal undeformed shape is considerably different than that of the retaining chamber.

Member 19 completely fills the bottom outer corner of chamber 24 and makes complete surface contact along the length of both the chamber walls 25 and 26. The upper surface of member 19 starts inwardly from the upper surface 22a (sometimes referred to hereinafter as the end or first bearing surface) of washer portion 22 substantially flush with the plane thereof and then raises upwardly to form an axially projecting portion 30 which is of rounded cross section. Similarly, the inner surface of member 19 starts upwardly substantially flush with the inner peripheral surface 23a (sometimes referred to hereinafter as the inner bearing surface) of washer projecting portion 23 and then turns inwardly to form an inwardly projection portion 31 of rounded cross section. The projections 30 and 31 do not meet at the inner corner of member 19 but are separated and spaced apart by an inner corner channel or void space 32 which is of right angular shape and is relieved below the plane of the upper surface 22a of washer 18 and outside of the surface of revolution in which the inner bearing surface 23a lies.

The purpose of void channel 32 is to provide a space into which the raised projections 30 and 31 may be deformed when the rivet shank 14 is passed through washer 18, and the latter is tightened upwardly against the surface of plate 11. The installed position of the device is shown in Figure 4, and as seen therein, member 19 has been deformed to fit into the rectangular cross sectional shape of chamber 24. Since the volume of member 19 is equal to or less than that of chamber 24, as was previously described, it is clear that this deformation may take place without any plastic extrusion of member 19 out of the confines of chamber 24.

It will be seen that the chamber 24 is thus defined by side wall 25, lower wall 26, by a plane passing through end bearing surface 22a and, on its fourth side, by a surface of revolution coincident with, and passing through, the inner peripheral surface 23a, said surface of revolution intersecting the plane passing through end bearing surface 22a.

It will be further noted that end bearing surface 22a, and inner peripheral bearing surface 23a, are generally perpendicular, and concentric with the central longitudinal axis of the washer.

The chamber 24, as defined, does not contain the projecting portions 30 and 31, except when the washer is tightened upwardly against the surface of plate 11, as shown in Figure 1.

It should be understood that the purpose of the invention is far more than to merely provide a sealing device which is capable of functioning in a satisfactory manner, and a review of the objects of the invention in light of the construction of the device will make this apparent. Considering the principle of resilient deformation to achieve tight sealing engagement, it will be seen that as the projecting portions 30 and 31 are deformed into channel 32 they exert a high memory pressure tending to return them to their undeformed shape. As a result the portions 30 and 31 make extremely high pressure contact with the surfaces of plate 11 and shank 14 along central lines or bands of engagement in both of the sealing planes. The shape of projecting portions 30 and 31, and the fact that they are raised from only a portion of the surfaces of the sealing member, causes them to exert a relatively high unit pressure against a smaller area of the opposed engaging surfaces than is the case with conventional sealing gaskets and, accordingly, a more effective high pressure seal is obtained.

Of equally important consideration, is the fact that the memory pressure exerted by portions 30 and 31 is not exerted at the outer and lower corners of the member 19 where plastic extrusion of the material out of the confines of chamber 24 would take place. In the latter areas there is little or no deformation of the member 19 and this, of course, means that the device can be reused repeatedly without losing its effectiveness.

It will also be seen that since the void channel 32 is defined entirely within the member 19, it is not affected by dimensional variation in the rigid washer 18 or the size of chamber 24. Since member 19 is molded in place it can be made to uniformly fill the outer and lower portions of chamber 24 under all tolerance conditions without affecting the volumetric relationship between the packing member and retaining body. In this connection it should also be noted that the conformation of member 19 lends itself to being molded with the lines of mold flash at the outer and lower edges of the member where they are spaced away from the working surfaces of projections 30 and 31. The latter may thus be accurately controlled in shape and size by highly polished mold surfaces and need not be trimmed before use. Variations in sealing effectiveness due to surface imperfections of flash areas or improper trimming are therefore avoided.

While I have shown and described in some detail a preferred embodiment of the invention, it is to be understood that modifications of design and construction can be made without departing from the spirit of the invention. Therefore, I do not wish to be restricted to the foregoing except as is defined in the appended claims.

I claim:

1. A sealing device, which comprises: a rigid retaining washer, having a central longitudinal axis, and defining an internal chamber, said washer having a first bearing surface, at least a portion of which is generally perpendicular to said central longitudinal axis, said washer also having an inner bearing surface at least a portion of which lies in a surface of revolution about said central longitudinal axis, said chamber opening axially in the direction of said first bearing surface and inwardly in the direction of said inner bearing surface, and being bounded by a first plane passing through said first bearing surface, and by said surface of revolution passing through said inner bearing surface portion, and intersecting said first plane; and a resilient deformable packing member, a part of which is fitted within said chamber, said packing member having a projecting portion extending axially beyond said first plane, and another projecting portion extending inwardly beyond said surface of revolution, said packing member having an inner recessed void channel formed between said projecting portions and lying within said chamber, said void channel having a volume sufficient to accommodate the material of said projecting portions.

2. A sealing device, which comprises: a rigid retaining washer, having a central longitudinal axis, and defining an annular internal chamber, said washer having a first bearing surface, at least a portion of which is generally perpendicular to said central longitudinal axis, said washer also having an inner bearing surface at least a portion of which lies in a surface of revolution about said central longitudinal axis, said chamber opening axially in the direction of said first bearing surface and inwardly in the direction of said inner bearing surface, and being further defined by a first plane passing through said first bearing surface, and by said surface of revolution passing through said inner bearing surface portion, and intersecting said first plane; and a resilient deformable packing member, a part of which is fitted within said chamber, said packing member having a rounded projecting portion extending axially beyond said first plane, and another rounded projecting portion extending inwardly beyond said surface of revolution, said packing member having an inner recessed void channel formed between said projecting portions and lying within said chamber, said void channel having a volume sufficient to accommodate the material of said projecting portions.

3. A sealing device, which comprises: a rigid retaining washer, having a central longitudinal axis, and defining an annular internal chamber of generally rectangular cross-section, said washer having a first bearing surface, at least a portion of which is generally perpendicular to said central longitudinal axis, said washer also having an inner peripheral bearing surface at least a portion of which lies in a surface of revolution about said central longitudinal axis, said chamber opening axially in the direction of said first bearing surface and inwardly in the direction of said inner peripheral bearing surface, and being bounded by a first plane passing through said first bearing surface, and by said surface of revolution passing through said portion of said inner peripheral bearing surface, and intersecting said first plane; and a resilient deformable packing member, a part of which is fitted within said chamber, said packing member having a projecting portion of rounded cross-section extending axially beyond said first plane, and another projecting portion of rounded cross-section extending inwardly beyond said surface of revolution, said packing member having an inner recessed void channel of generally rectangular cross-section formed between said projecting portions and lying within said chamber, said void channel having a volume sufficient to accommodate the material of said projecting portions.

4. A sealing device, which comprises: a rigid retaining washer having a central longitudinal axis, said washer having an outer annular portion with a first bearing surface, at least a portion of said first bearing surface being substantially perpendicular to said central longitudinal axis, said washer also having an inner annular portion with an inner peripheral bearing surface, at least a portion of said inner peripheral bearing surface being substantially concentric about said central longitudinal axis, said washer defining an annular retaining chamber of generally rectangular cross-section opening axially in the direction of said first bearing surface and inwardly in the direction of said inner peripheral bearing surface, and being further defined by a first plane passing through said first bearing surface, and by an annular surface of revolution coincident with, and passing through said inner peripheral bearing surface, and intersecting said first plane; and a resilient deformable packing member, a part of which is fitted within said chamber, said packing member having a projecting portion extending axially beyond said first plane, and another projecting portion extending inwardly beyond said annular surface of revolution, said packing member having an inner recessed void channel formed between said projecting portions and lying within said chamber, said void channel having a volume sufficient to accommodate the material of said projecting portions.

5. A sealing device, which comprises: a rigid retaining washer, having a central longitudinal axis, and defining an internal annular chamber, said washer having an annular end bearing surface which is generally perpendicular to, and spaced from, said central longitudinal axis, said washer also having an inner annular bearing surface, lying in an annular surface of revolution about said central longitudinal axis, said chamber opening axially in the direction of said annular end bearing surface and inwardly in the direction of said inner annular bearing surface, and being further defined by a first plane passing through said annular end bearing surface, and by said annular surface of revolution passing through said inner annular bearing surface, and intersecting said first plane; and a resilient deformable packing member, a part of which is molded within said chamber, said packing member having a projecting portion of rounded cross-section extending axially beyond said first plane and being spaced inwardly from said annular end bearing surface, and another projecting portion of rounded cross-section extending inwardly beyond said annular surface of revolution, said packing member having an inner recessed void channel formed between said projecting portions and lying within said chamber, said void channel having a volume sufficient to accommodate the material of said projecting portions.

6. A sealing device, which comprises: a rigid retaining washer having a central longitudinal axis, said washer having an outer annular portion with a first bearing surface, at least a portion of said first bearing surface being substantially perpendicular to said central longitudinal axis, said washer also having an inner annular portion with an inner peripheral bearing surface, at least a portion of said inner peripheral bearing surface lying in a cylindrical surface of revolution about said central longitudinal axis, said washer thus defining an annular retaining chamber of generally rectangular cross-section opening axially to said first bearing surface and inwardly to said cylindrical surface of revolution; and a resilient deformable packing member, a part of which is fitted within said chamber, said packing member having a projecting portion of rounded cross-section extending axially beyond said first plane and being spaced inwardly from said first bearing surface, and another projecting portion of rounded cross-section extending inwardly beyond said cylindrical surface of revolution, said packing member having an inner recessed void channel of substantially rectangular cross-section formed between said projecting portions and lying within said chamber, said void channel having a volume sufficient to accommodate the material of said projecting portions.

7. A sealing device which comprises: a rigid retaining washer having a central longitudinal axis and defining an annular chamber, said washer having a first bearing surface, at least a portion of which is generally perpendicular to said central longitudinal axis, said washer also having a second bearing surface of revolution about said central longitudinal axis, said chamber opening axially in the direction of said first bearing surface and radially in the direction of said second bearing surface, and being bounded by a first plane passing through said first bearing surface, and by said surface of revolution passing through said portion of said second bearing surface and intersecting said first plane; and a resilient deformable packing member, a portion of which is fitted within said chamber, said packing member having a projecting portion extending axially beyond said first plane, and another projecting portion extending radially beyond said surface of revolution, said packing member having an annular recessed void channel formed between said projecting portions and lying within said chamber, said void channel having a volume sufficient to accommodate the material of said projecting portions.

8. A sealing device which comprises: a rigid retaining washer having a central longitudinal axis and defining an annular chamber, said washer having a first bearing surface, at least a portion of which is generally perpendicular to said central longitudinal axis, said washer also having a second bearing surface at least a portion of which lies in a surface of revolution about said central longitudinal axis, said chamber opening axially in the direction of said first bearing surface and radially in the direction of said second bearing surface, and being bounded by a first plane passing through said first bearing surface, and by said surface of revolution passing through said portion of said second bearing surface and intersecting said first plane; and a resilient deformable packing member, a part of which is fitted within said chamber, said packing member having a rounded projecting portion extending axially beyond said first plane, and another rounded projecting portion extending radially beyond said surface of revolution, said packing member having an annular recessed void channel formed between said projecting portions and lying within said chamber, said void channel having a volume sufficient to accommodate the material of said projecting portions.

References Cited in the file of this patent

UNITED STATES PATENTS

| | | |
|---|---|---|
| 1,096,846 | Lane et al. | May 19, 1914 |
| 1,208,620 | Moser | Dec. 12, 1916 |
| 2,611,285 | Gross | Sept. 23, 1952 |

FOREIGN PATENTS

| | | |
|---|---|---|
| 739,490 | Great Britain | Nov. 2, 1955 |